Nov. 15, 1966 G. HOMANICK 3,285,079
METHOD AND APPARATUS FOR TRANSFERRING ARTICLES
Filed April 11, 1963 11 Sheets-Sheet 1

INVENTOR.
GEORGE HOMANICK
BY
WILSON, SETTLE & CRAIG
ATTORNEYS

Nov. 15, 1966  G. HOMANICK  3,285,079
METHOD AND APPARATUS FOR TRANSFERRING ARTICLES
Filed April 11, 1963  11 Sheets-Sheet 2

INVENTOR.
GEORGE HOMANICK
BY
WILSON, SETTLE & CRAIG
ATTORNEYS

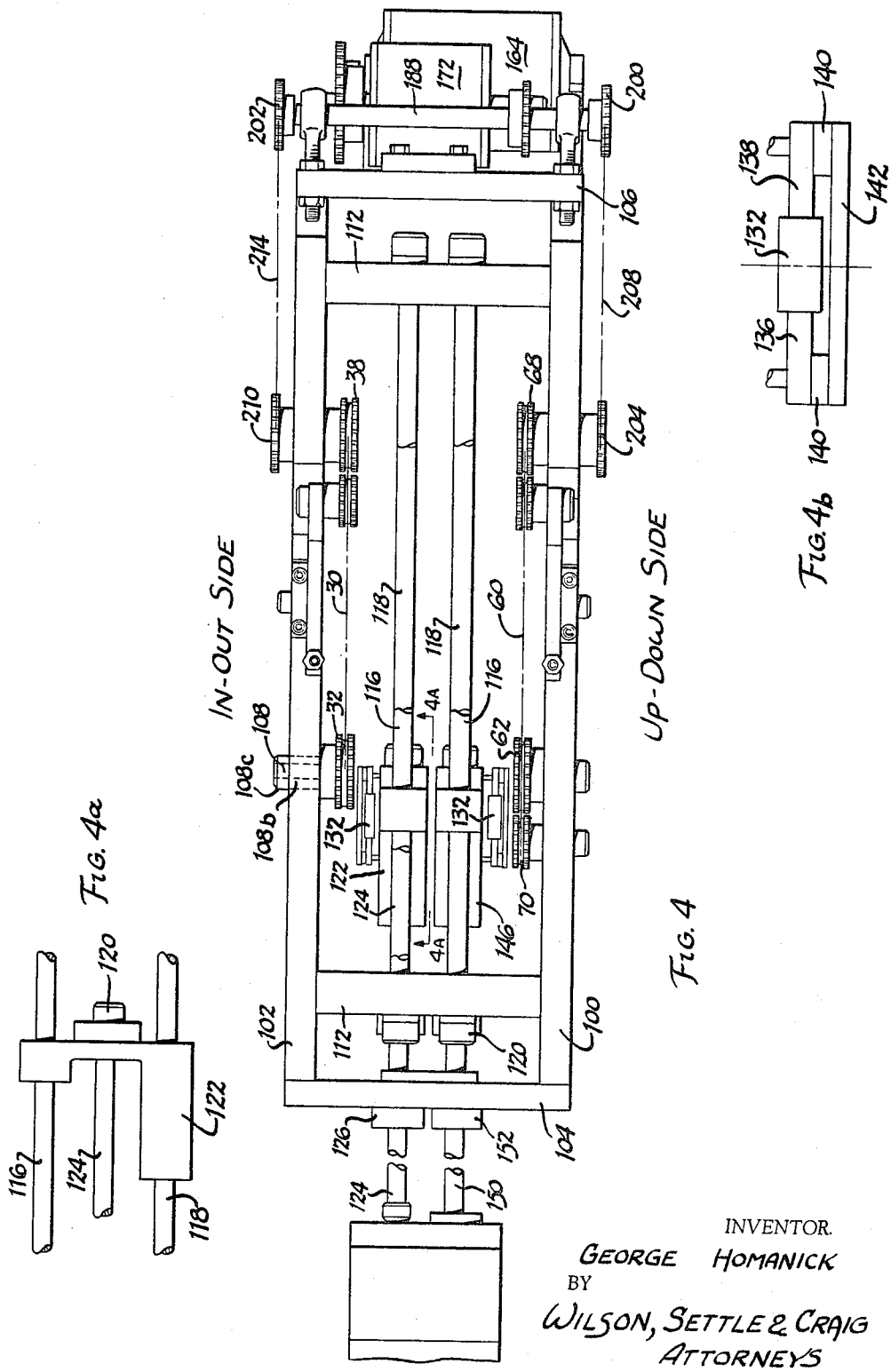

Nov. 15, 1966 G. HOMANICK 3,285,079
METHOD AND APPARATUS FOR TRANSFERRING ARTICLES
Filed April 11, 1963 11 Sheets-Sheet 4
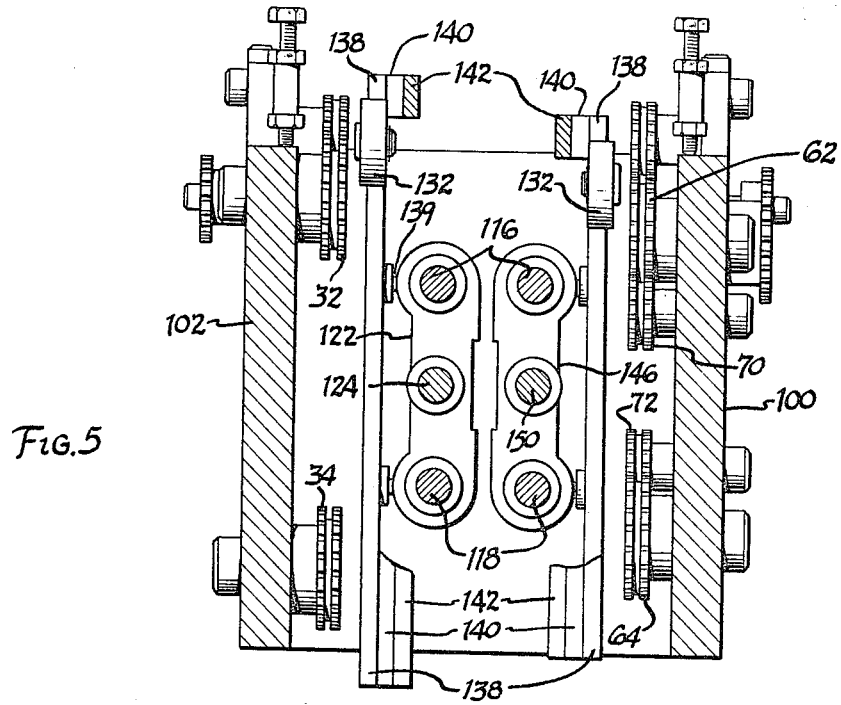
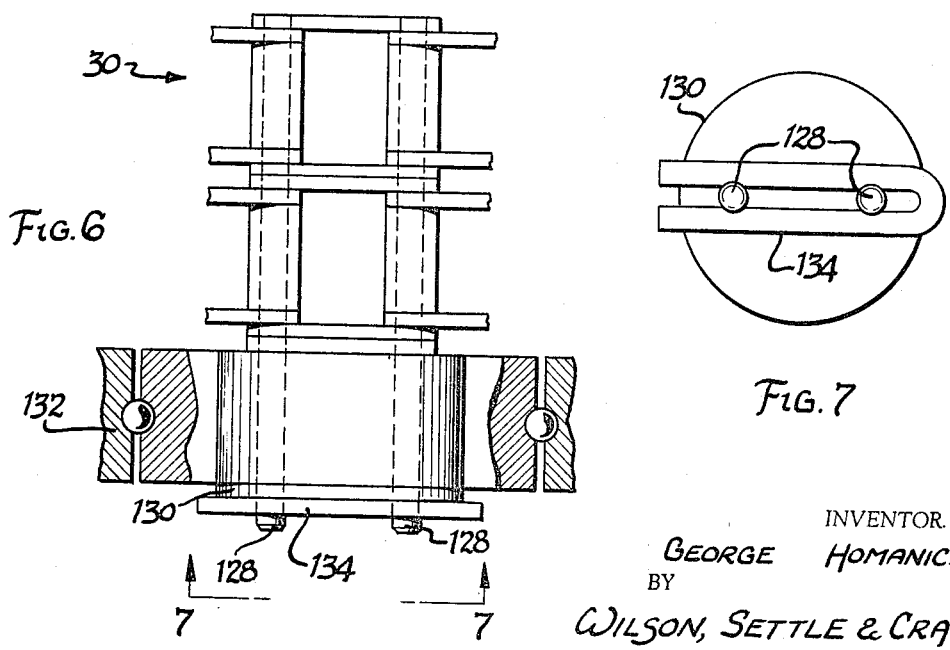
INVENTOR.
GEORGE HOMANICK
BY
WILSON, SETTLE & CRAIG
ATTORNEYS

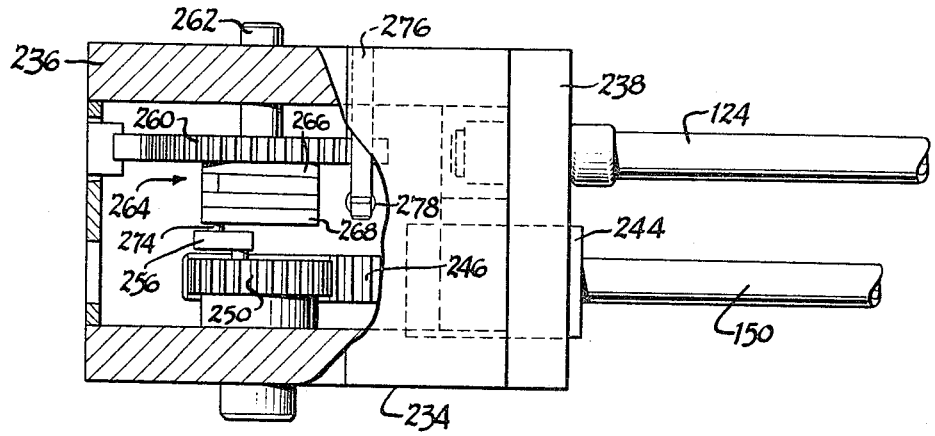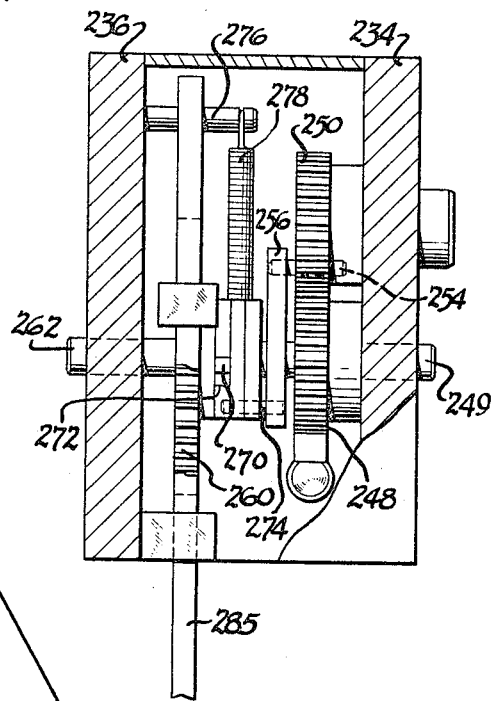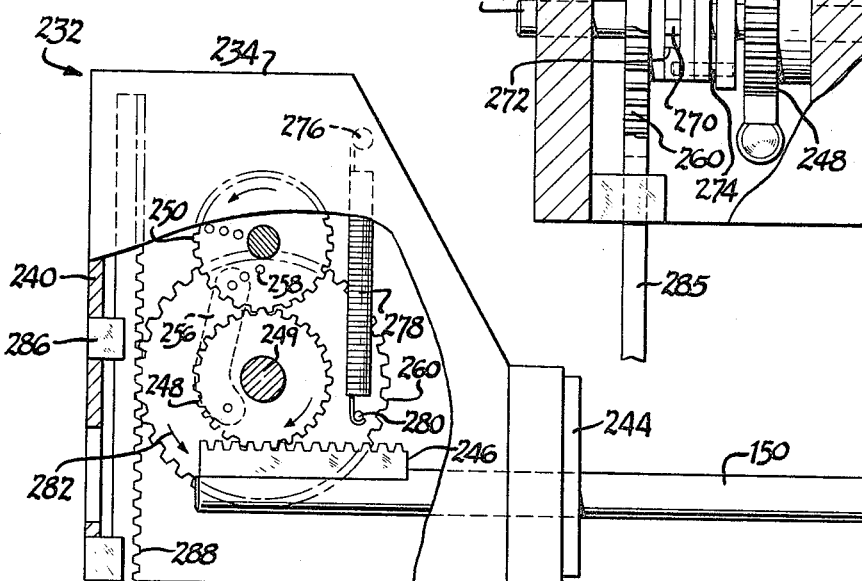

Nov. 15, 1966 G. HOMANICK 3,285,079
METHOD AND APPARATUS FOR TRANSFERRING ARTICLES
Filed April 11, 1963 11 Sheets-Sheet 10

INVENTOR.
GEORGE HOMANICK
BY
WILSON, SETTLE & CRAIG
ATTORNEYS

Nov. 15, 1966  G. HOMANICK  3,285,079
METHOD AND APPARATUS FOR TRANSFERRING ARTICLES
Filed April 11, 1963  11 Sheets-Sheet 11
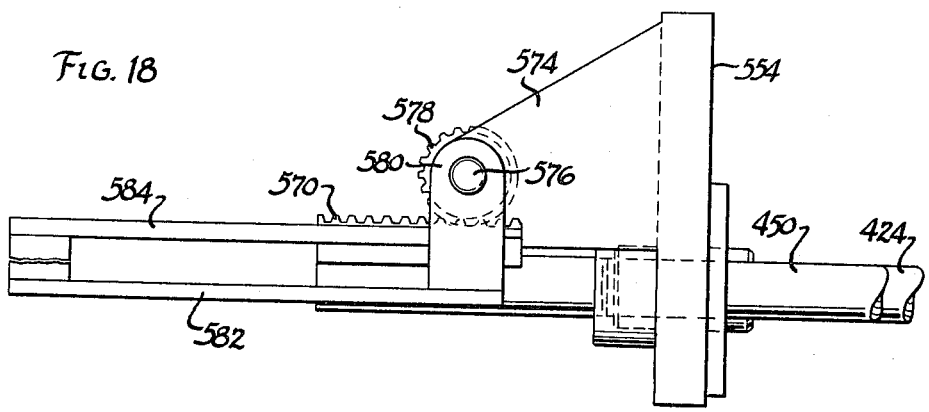
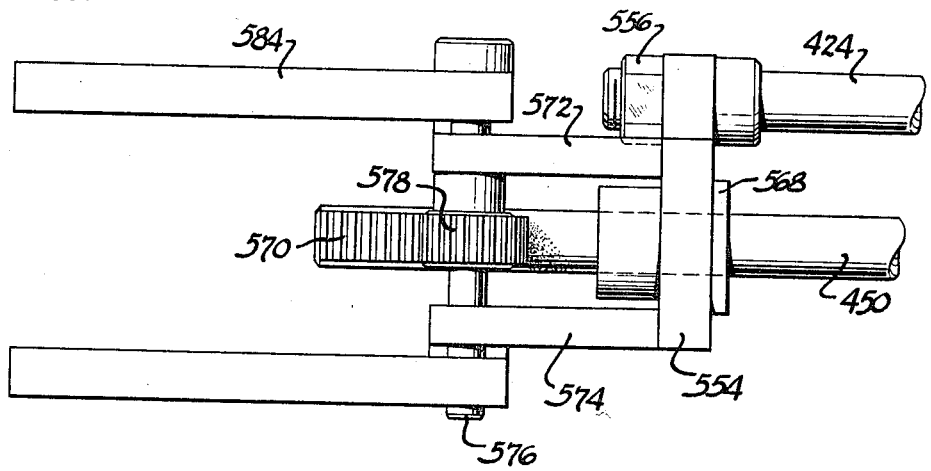
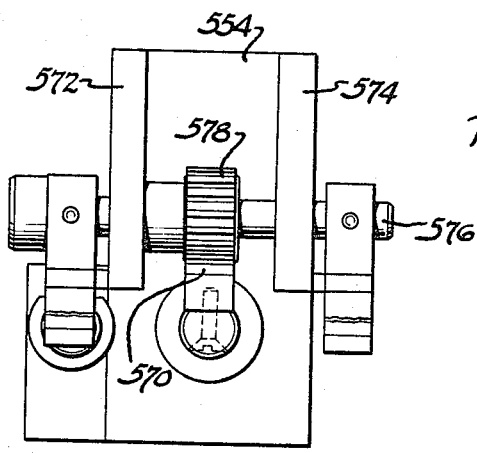
INVENTOR.
GEORGE HOMANICK
BY
WILSON, SETTLE & CRAIG
ATTORNEYS

United States Patent Office 3,285,079
Patented Nov. 15, 1966

3,285,079
METHOD AND APPARATUS FOR TRANSFERRING ARTICLES
George Homanick, Livonia, Mich., assignor to The Leyman Corporation, Cincinnati, Ohio
Filed Apr. 11, 1963, Ser. No. 272,315
7 Claims. (Cl. 74—37)

This invention relates to apparatus and method for developing a motion and a successive dwell between said motion and a similar or different motion.

More particularly this invention relates to apparatus and method for developing motions and dwells in the nature of those developed by rotary cams, but instead utilizing linear motions that change in directions; and being characterized by transmission of the motions directly into useful work functions.

Still more particularly this invention relates to apparatus and method for producing synchronized motions and dwells by utilizing at least two linearly moving elements traveling through predetermined paths at the same linear speed, the paths being of the same length, but of different configurations.

ESSENCE OF THE PRIOR ART

Prior art—Rotary cam expense and complexity

It is well known that rotary cams have gained wide acceptance and use in industry for performing work motions with intermittent dwells.

Items such as sewing machine needles are moved by such cams. Also, different elements of machines are synchronized and correlated in their movements by such cams.

However, it is equally well known that inherent in the structure of such rotatable cams are the following characteristic disadvantages:

(1) Rotary cams are expensive. That is to say, in order to impart accuracy to the profile of a rotary cam to provide controlled tolerances of motion in the range of thousandths of an inch, expensive and careful machining of the profile to exacting limits is required. Consequently, highly accurate rotary cams are known to cost as much as $2,000.00.

(2) Rotary cams all require an intermediate linkage system for translating the radially changing profile into linear or other work motion and dwell.

(3) Rotary cams capable of producing large motion, on the order of ten inches of movement, would have either to be extremely large or require motion multiplying linkages. The expense, bulk and complexity are obvious.

Accordingly, in view of the foregoing, it would provide a substantial step forward in the art if apparatus and method could be provided to produce the equivalent of rotary cam motions and dwells, but in a more economical manner and by translating the actual cam profile or path, so to speak, directly into usable work motion or dwell, without intervening linkage systems.

Prior art—Rotary cam synchronization

Also, as is well known in the art, one rotary cam can be synchronized with another. However, this also entails substantial expense. As is well known, synchronization of rotary cams is effected by degrees of dwell, i.e., by rotary degrees and minutes of rotation. Very accurate profile development is therefore required, and this is expensive, particularly for close tolerances. Timing is therefore complex and costly.

When it is desired to synchronize the dwell or motion of one rotary cam with an action or dwell of another rotary cam, the dwell of the one cam must be precisely established in terms of degree of rotation. This means that the cam lobes and flats must be established very carefully and machined within precise degree limits. As is evident, precision grinders are required for doing such work, expensive layout labor is entailed and cost of calculations are high. These and other factors make rotary cam development and manufacture an expensive proposition at the least.

Further, but not least, there is the problem of setting the manufactured cams upon shafts in properly oriented relation relative to one another. This requires precision workmanship.

Accordingly, a further advancement to the art would be provided by apparatus and method for producing synchronized cam motions and dwells in a more economical manner than heretofore produced by rotary, profiled cams containing dwells established by degrees of rotation.

OBJECTS

Accordingly, it is an important object of the present invention to provide apparatus and method for producing the equivalent of cam-produced motions and dwells, but utilizing linearly moving flexible lines travelling in predetermined paths, wherein change of direction of path produces dwell.

A further object is to provide apparatus for producing the equivalent of cam motions and dwells, comprising a flexible line moved in a predetermined path of fixed length and characterized by the fact that the predetermined path of movement is translated directly into end use motion and dwell.

A further object is to provide the equivalent of synchronized cam motions utilizing at least two flexible elements travelling in different paths, but of identical length.

A still further object is to provide novel motion and dwell producing apparatus functioning in the nature of rotary cams but utilizing at least two separate flexible line elements travelling in predetermined paths whereby during the dwell period of one element, the other element is producing a synchronized motion or dwell.

A further object is to produce apparatus and method for effecting the work of rotary cams, utilizing flexible linear elements traveling in predetermined paths.

A further object is to provide the equivalent of cam dwell by change of path of movement of a linear moving flexible element traveling through a predetermined path of unchanging length.

Other objects of this invention will appear in the following description and appended claims, reference being had to the accompanying drawings forming a part of this specification wherein like reference characters designate corresponding parts in the several views.

FIGURE 3 is a side elevation of a loader forming a first embodiment of the invention and utilizing the motions and dwells of FIGURES 1 and 2;

FIGURE 3a is a fragmentary detail relating to chain-sprocket lap;

FIGURE 3b is a fragmentary perspective of a chain-carriage connection;

FIGURE 4 is a top plan view of FIGURE 3;

FIGURE 4a is a fragmentary side elevation showing a movable carriage utilized in FIGURE 4;

FIGURE 4b is an enlarged fragmentary top plan of a carriage guideway used in FIGURE 4;

FIGURE 5 is a section view taken along line 5—5 of FIGURE 3;

FIGURE 6 is an enlarged fragmentary plan view of one chain-roller connection;

FIGURE 7 is an elevation along line 7—7 of FIGURE 6;

FIGURE 9 is a left side elevational view with parts broken away of the positioning head of FIGURES 3 and 4;

FIGURE 10 is a left hand elevation of FIGURE 9 with parts broken away;

FIGURE 11 is a top plan of FIGURE 9 with parts broken away;

FIGURE 14a is a fragmentary side elevation of a chain "bodying" system used in FIGURE 14;

FIGURE 15a is an alternate chain-roller mounting;

FIGURE 17 is an enlarged section taken along the line 17—17 of FIGURE 14a;

FIGURE 18 is a side elevation of the positioning head of the embodiment of FIGURE 14;

FIGURE 19 is a top plan view of FIGURE 18; and

FIGURE 20 is a front elevation of FIGURE 18.

Figure 1:
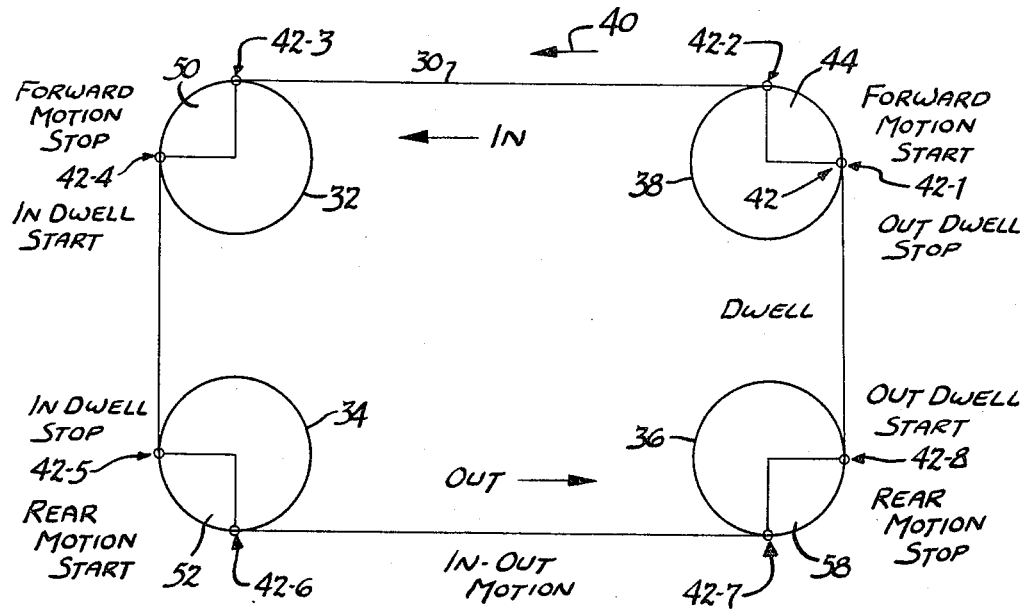
FIGURE 1 is a schematic view illustrating a first motion and dwell produced in accordance with the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

BRIEF PERSPECTIVE

Briefly, the present invention relates to apparatus and method for the production of motion and dwells utilizing flexible, non-extensible tensile members or linear elements, moved linearly through specific paths of unchanging length.

An important aspect of the invention is the ease of synchronization of one motion-dwell pattern with that of another motion-dwell pattern. This is effected through the use of at least two separate flexible, non-extensible linear elements, each moved linearly through its own specified path. The paths of each element are different, but the paths are both of exactly the same length, thus assuring and maintaining the synchronization aspect of the invention.

In its broader aspect, of course, the invention resides in the use of two or more such elements and paths to provide synchronization of any selected number of motions and dwells.

It is deemed obvious that motions and dwells synonymous or analogous to those produced by rotary cams and developed in accordance with the invention have a broad variety of end applications. In the present specification, two specific embodiments of loaders utilizing the motion and dwell principles of the invention will be described. However, it will be understood that these are not to be considered limiting upon the broad scope of invention.

In view of the foregoing resume, a complete description of the two specific embodiments as applied to loaders now follows.

SPECIFIC EMBODIMENTS — APPLICATION OF SYNCHRONIZED MOTIONS OF THE INVENTION TO LOADERS OR ARTICLE TRANSFER DEVICES

A FIRST SPECIFIC EMBODIMENT

*In-out and up-down loader*

FIGURES 1–11 illustrate a loader or article transfer device or apparatus that is adapted to perform the following operations:

| First Motion (In-Out): | Second Motion (Up-Down) |
|---|---|
| (cycle) | |
| (a) Reach out | Dwell.* |
| (b) Dwell | Move down. |
| (c) Dwell | Dwell (Grasp). |
| (d) Dwell | Move up. |
| (e) Pull back in | Dwell.* |
| (f) Dwell | Move down. |
| (g) Dwell | Dwell (Release). |
| (h) Dwell | Move up. |
| (cycle) | |

* No relative movement between first and second motions.

From the foregoing, it will be observed that as the transfer arm reaches out, the up-down motion is dwelling, or the work head carried at the end of the transfer arm is remaining quiet. Then, after the reach is completed, the in-out motion dwells and the second motion is converted to a down motion. Then, the down motion dwells, while a suction cup or electromagnet is actuated to grasp a piece; and the work head then moves up and dwells. Then the transfer arm pulls the work head back in during dwell of the head. Then, as the transfer arm dwells in the IN position, the head again moves down, dwells and moves to deposit an articles and then moves up.

The cycle is then ready to repat.

It will be understood as the description develops that these motions are synchronized with the movement or action of a press or other device with which the loader is operatively associated (either by clutch-brake arrangement or direct drive). This embodiment of the invention can also be synchronized with movement of parts along an assembly line while the work head is reaching to a supply, grasping a part, and then placing the part in assembled position on another part moving down the assembly line.

Figure 2:
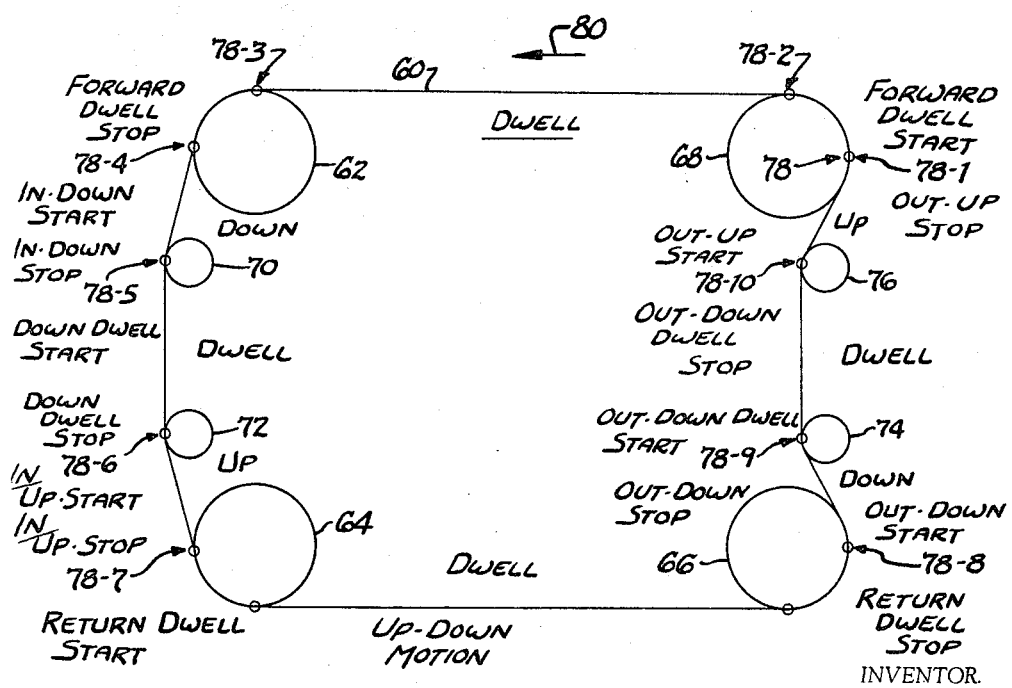
FIGURE 2 is a schematic view illustrating a second motion and dwell synchronized with the motion and dwell of FIGURE 1, and also produced in accordance with the invention.

The theory—FIGURES 1 and 2

To provide a basis for describing the various elements of the loader of this embodiment of the invention and its two different motions, please refer to FIGURES 1 and 2.

In-out motion

In FIGURE 1, the in-out motion and intervening dwells therebetween are shown schematically, but precisely, as they are effected in the apparatus shown in FIGURES 3–11.

In both embodiments of this invention, chains have been utilized because of flexibility, ease of removal or addition of links to adjust length and non-stretchable characteristics. In addition, chains are economical.

Accordingly, the chain of FIGURE 1 is designated by the reference numeral 30. This is supported on sprockets 32, 34, 36 and 38 that in turn are supported upon a machine frame element, not shown for greatest clarity at this point.

It will be observed that the four sprockets 32, 34, 36 and 38 have their centers precisely at the four corners of a vertically disposed and horizontally elongated rectangle. Thus, the four sprockets 32, 34, 36 and 38 establish the precise path of movement over which the flexible chain 30 is traveled through linear and curvilinear motions. In explanation, let it be stated that the chain 30 moves in the arrow 40 direction.

The IN or reach out motion

The point Forward Motion Start at the backside of sprocket 38 will be used as initial reference point for the work connection point 42. This is designated 42–1.

The point Forward Motion Stop point, at the front side of sprocket 32, represents the forward limit of IN movement. This is position 42–4 of work point 42.

From the foregoing, it will be understood that with chain 30 moving in the arrow direction 40, the IN motion of the work point 42 begins at Forward Motion Start point 42–1, moves from 0 to full acceleration while traveling the 90° quadrant 44 of sprocket 38 to point 42–2. Full acceleration is attained at the point 42–2. Between the points 42–2 and 42–3, IN motion at full speed is provided.

From the point 42–3, the work connection point 42 decelerates from full speed to 0 while passing through the quadrant 50 and, at the point 42–4 or Forward Motion Stop point, comes to a halt.

At the point 42–4, or Forward Motion Stop point, the dwell takes over at In Dwell Start. This is sustained until the position 42–5 or In Dwell Stop is reached. At this point, the rear motion takes over, indicated Rear Motion Start. Here the work point 42 moves from 0 acceleration to full speed as it passes through quadrant 52, attaining full speed at the point 42–6. Between the point 42–6 and the point 42–7, the work point 42 will be understood to be traveling out at full speed. Then deceleration from full speed to 0 is effected through quadrant 58 between points 42–7 and 42–8. Rear Motion Stop is reached at point 42–8. At this point, the out dwell starts, and continues between Out Dwell Start point 42–8 and Out Dwell Stop or point 42–1.

This completes the full cycle IN-OUT motion with intermittent dwells; the IN motion is now ready to recommence.

As previously described, the work point 42 decelerates through the quadrant 50 while continuing the movement of the first lineal path. When the work point 42 leaves the point 42–4 and during the time it travels to the point 42–5, a true dwell is established analogous to that obtainable on a rotary cam, and an instantaneous changeover is provided, analogous to a square corner on a rotary cam. However, when the point 42 enters quadrant 52, it makes a true or instantaneous reversal of direction, and accelerates at the same rate as the previous deceleration.

The up-down motion

Referring now to FIGURE 2, note a second chain 60, supported upon four principal sprockets 62, 64, 66 and 68.

In addition to the principal sprockets 62–68, there are four up-down sprockets 70, 72, 74 and 76. The forward or left hand set of up-down sprockets 70 and 72 establishes down, intermittent dwell and up motions at the forward end of the IN motion established by chain 30, FIGURE 1. The rear or right hand set of up-down sprockets 74, 76, provides down, intermittent dwell and up motions at the OUT position during the dwell 42–8 to 42–1 of chain 30, FIGURE 1.

Now beginning with the work connection point 78–1 on chain 60 of FIGURE 2, we observe that this point travels in exact synchronism with the point 42 on chain 30 between the points 78–1 and 78–4. Acceleration, full speed and deceleration according to the point 42 between points 42–1 and 42–4 are provided. This of course is premised on the fact that sprockets 68, 62, 64 and 66 are of exactly the same size as sprockets 38, 32, 34 and 36 and are driven at exactly the same speed; thus chains 60, 30 move at exactly the same speed. In the loader to be described, the chains 60, 30 are positioned in side-by-side relation. Thus, in the loader to be described, the work points 42, 78 are in exact horizontal alignment at all times. Still further, the length of the path or the length of chain 30 is exactly the same as the length of chain 60.

Referring further to FIGURE 2, presume chain 60 to move in arrow 80 direction in synchronism with movement of chain 30. The Forward Dwell Start point 78–1 represents the beginning of the dwell for work point 78 during the IN movement of a transfer of arm, produced through cooperation with chain 30. This dwell is derived because of the same movement of work point 78 between 78–1 and 78–4, as for point 42 between 42–1 and 42–4. Relative movement is required to produce the up-down as will become apparent. Thus, for this phase of movement, points 42 and 78 trace duplicate paths with no relative motion between them.

This dwell continues to point Forward Dwell Stop, or 78–4, on sprocket 62. This is equivalent to point 42–4 of FIGURE 1.

Now while the work point 42 on chain 30 moves down to produce its IN dwell, the work point 78 generates a down motion at the point 78–4 (In Down Start) and continues the down motion to the point 78–5 (In Down Motion Stop). At the point 78–5 (Down Dwell Start), the down dwell starts and continues to the point 78–6 (Down Dwell Stop). It can be visualized from this much of the description that a pickup head on the end of the transfer arm is moved down to contact a stack of material. When a suction or other grasp device on the pickup head contacts the top element of the stack, dwell is provided to allow the suction device to be actuated to take hold of the top article of the stack.

At 78–6 (In Up Start), the up motion starts and is finished at the point 78–7 (In Up Stop). From point 78–7 (Return Dwell Start) to point 78–8 (Return Dwell Stop), there is a dwell in the up-down motion (because of no relative motion to point 42), providing a carrying position for the article held by the pickup head.

In FIGURE 2, at the point 78–8 (Out Down Start), a down motion starts, extending to the point 78–9 (Out Down Stop). At point 78–9 (Out Down Dwell Start), a dwell motion starts at the bottom of the down stroke permitting the pickup device to be deactivated and deposit the article at a given position or location. At 78–10 (Out Down Dwell Stop), the dwell is completed. At the point 78–10 (Out Up Start), the up motion starts, and ends at the point 78–1 (Out Up Stop).

This completes full cycle of the up-down movements, and the cycles of both chains are now ready to be repeated.

In view of the foregoing explanations of the theory of operation, one actual mechanism for carrying out these operations as applied to an in-out and up-down loader will now be described in detail relative to FIGURES 3–11 of the drawings.

The actual in-out and up-down loader of FIGURES 3–11

In FIGURES 3 and 4, a machine frame is represented by vertically disposed and elongated rectangular side walls 100 and 102. The frame also includes a front wall 104 and a back wall 106.

The in-out side

To the side wall 102, are mounted the four sprockets 32, 34, 36 and 38 described relative to FIGURE 1. Typical mounting for these sprockets is shown for 32 in FIGURE 4. This includes a shaft 108 positioned in a bushing 108b secured into wall 102. A collar 108c retains the shaft and sprocket. To the exposed inner end of the shaft 108, the sprocket 32 is applied.

To complete the assembly, a bracket 112 is provided at the front between walls 100 and 102 and a similar bracket 112 at the rear end. Note that these brackets have vertically disposed upper and lower bores to receive upper and lower guide rods 116 and 118. Cap screws 120 hold the rods 116, 118 in place. Duplicate rod sets 116, 118 are provided each side, see FIGURES 4 and 5. The purpose of the second set will be described later.

In conjunction with FIGURE 5, also note FIGURES 4 and 4a for a carriage 122 which is provided with parallel bores to slide on the guide rods 116 and 118.

An in-out rod 124 is fastened at the back end to carriage 122, utilizing a cap screw 120. Rod 124 slides through a bushing 126 in front wall 104.

It will be understood that if the carriage 122 is moved back and forth, the in-and-out rod 124 will also be moved and anything such as a grasp or transfer or actuating head carried thereon, as at the forward end thereof also will be moved with the rod 124.

The work connection point

As was previously mentioned relative to FIGURE 1, the chain 30 has a work connection point 42. At this time, it should be pointed out that the chain 30 is trained upon the sprockets 32, 34, 36 and 38, shown in FIGURES 3, 4 and 5. The work connection point is actually a connection between chain 30 and carriage 122. This takes the form of a roller on the chain and a roller guide on the carriage.

In FIGURES 6 and 7, a double width chain 30 is shown with a cantilevered roller 132. Pins 128 are extended to one side from the chain 30 through a hub 130, carrying the ball bearing roller 132. A clip 134 holds the hub 130, roller 132 in place. This roller cooperates with a guide on carriage 122 to complete the connection. To complete the description of the roller-carriage connection, refer to FIGURES 3, 3b, 4, 4b and 5 and observe that parallel vertically disposed and horizontally spaced guide plates 136 and 138 are connected to carriage 122 with bolts 139, FIGURE 5. Spacers 140 are provided top and bottom on plates 136 and 138, and bridge members 142 tie the plates 136 and 138 together into a rigid guide-way. It should be stated that the plates 136, 138 are spaced apart a sufficient distance to accommodate the periphery of roller 132 in close running alignment therebetween. A few thousandths inch tolerance is acceptable for this mechanism.

From the foregoing, it will be observed that as the chain carries the roller 132, it will move the guide-way 136, 138 and connected carriage 122 with it. This causes the in-and-out rod 124 to be simultaneously moved in the same manner. When it is understood that a work head is carried on the exposed end of the in-and-out rod 124, it will be understod that this work head is moved with the in-and-out rod in the same direction and manner.

From the foregoing, we have thus established the support mechanism and transport mechanism for the in-and-out rod 124 have been established.

The up-down side

Referring also to FIGURES 3, 4 and 5 of the drawings, observe the construction and operational configuration of the up-down motion producing mechanism that operates in synchronism with the in-out motion producing mechanism.

Thus, the side wall 100 carries a plurality of four main chain support sprockets as described for FIGURE 2. These are designated 62, 64, 66 and 68, since they are identically situated as described relative to FIGURE 2. These are rotatably mounted on the side wall 100 in the same manner as described for sprocket 32.

In addition to the four main chain path establishing sprockets 62, 64, 66 and 68, there are four additional sprockets establishing up-down motions with dwells between. Thus, referring to FIGURE 3, note the forward set of up-down sprockets 70 and 72. These are also mounted on the side wall 100 as shown in FIGURE 4 for sprocket 70, aligned with sprockets 62, 64, 66 and 68.

The two rear up-down sprockets are designated 74 and 76 and are shown in FIGURE 3. All sprockets 62, 64, 66, 68, 70, 72, 74 and 76 are lapped as indicated in FIGURE 3 by the chain 60.

As shown in FIGURES 4 and 5, a left hand carriage 146 rides the left hand set of rods 116, 118. This is shown in FIGURE 3 dotted in its reverse position. FIGURE 4 is the forward position. Carriage 146 accommodates the back end of a thrust rod 150, performing up-down function as will be hereinafter described. Rod 150 slides through a bushing 152 in the front wall 104.

The manner in which the carriage 146 is tied operatively to chain 60 is similar to that described between carriage 122 and chain 30. This includes the roller 132 set-up illustrated in FIGURE 6. The carriage 146 includes two vertically disposed, parallel and horizontally spaced guid plates 136 and 138, similar to FIGURE 4a but turned 180°. These carry spacers 140 top and bottom, and bridge members 142 tie plates 136 and 138 together with an appropriate gap for roller 132.

It will be observed that horizontal motion of cantilevered roller 132 by chain 60 imparts corresponding motion to carriage 146.

From the foregoing, it will be understood that when the chains 30 and 60 are driven in at synchronized lineal speeds and with the cantilevered rollers 132 in exact side-by-side relation, and with the chains 30, 60 being of exactly the same length, that movements will be synchronized. This is the same effect as provided by two rotary cams mounted on a common shaft and rotating together.

Exact sprocket lap

It may appear from FIGURES 2 and 3 that the work point 78 or roller 132 does not leave sprocket 62 at the same time the point 42 of chain 30 leaves sprocket 32. However, this actually is the case and, as shown in FIGURE 3a is provided by an auxiliary roller 62a. This holds the chain 60 lapped on the sprocket 62 to the exact point 78-4 of FIGURE 2. Thus, exact synchronism with point 42-4 of chain 30 as illustrated in FIGURE 1 is provided.

The driving mechanism

Figure 8:
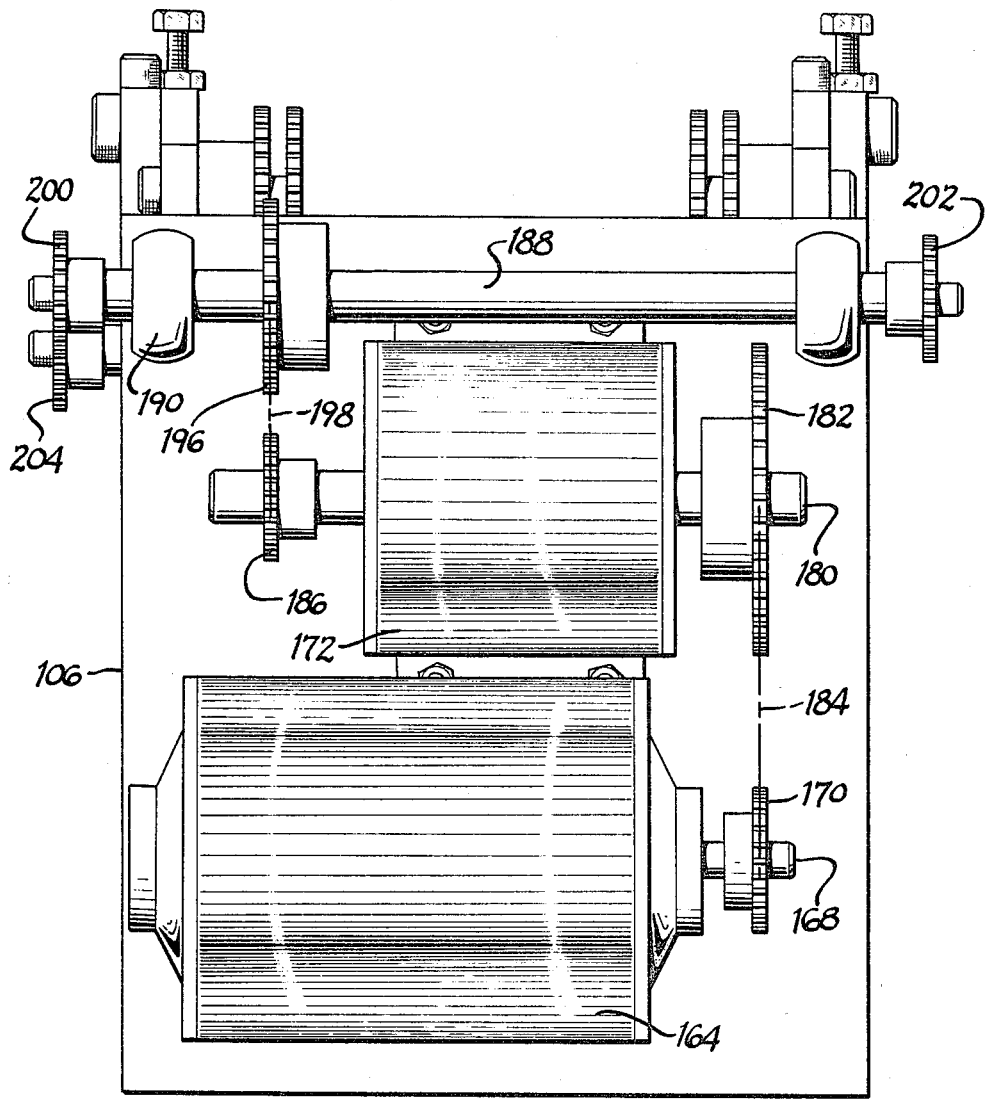
FIGURE 8 is an enlarged right end elevation of FIGURE 3.

Referring now to FIGURES 3, 4 and 8, one driving mechanism for the two chains 30 and 60 will be described.

To the back wall 106, there is mounted a motor 164 on brackets 166. The motor 164 includes a shaft 168 carrying a sprocket 170 on its exposed end.

Above the motor 164, there is mounted a clutch brake unit 172. Clutch-brake 172 includes a shaft 180 and as shown in FIGURE 8 the right end is provided with a sprocket 182. A chain 184 laps sprockets 170, 182.

Also, as shown in FIGURE 8, the left end of shaft 180 of clutch brake unit 172 carries a sprocket 186.

Above the clutch brake unit 172, there is mounted a jack shaft 188 by means of bearings 190, having bolt portions 192, FIGURE 3, extended through wall 106 and secured by nuts. Jack shaft 188 carries a sprocket 196 in alignment with sprocket 186 and a chain 198 laps these two sprockets.

To each end of jack shaft 188 are applied sprockets 200 and 202. Referring now to FIGURE 4, it will be noted that a drive sprocket 204 is connected to the shaft that supports sprocket 68. A chain 208 laps sprockets 200 and 204 to provide a drive connection. On the other side of the machine, a sprocket 210 is carried on the shaft for sprocket 38 and a chain 214 provides a driving connection.

From the foregoing, it will be observed that chains 30 and 60 are driven at the same speed in locked-together relation through jack shaft 188 by virtue of the fact that sprockets 200, 202 are of the same size and that sprockets 204, 210 are also of the same size, for identical driving speed.

Chain tightening mechanism

This is illustrated in FIGURES 3 and 4. Such apparatus comprises a block 216 fastened as by bolts to wall 100. Block 216 carries a pivot shaft 222 onto which is mounted a level 224. At the forward end the lever 224 carries a chain-engaging sprocket 226 that by being biased against the chain provides the necessary degree of tightening. At the back end, the lever 224 carries an adjusting bolt 228 with lock nuts to establish fixed position.

The actuating head

By reference to FIGURES 9, 10 and 11, it will be observed that the actuating head is designated by the reference numeral 232. This unit comprises side walls 234 and 236, connected by a back wall 238 and a front wall 240. By reference to FIGURE 11, it will be noted that the in-out shaft 124 is tied into back wall 238 being locked by nuts. A bushing 244 is carried by wall 238 to accommodate the front end of shaft 150 in sliding relation. The front end of shaft 150 has a rack 246 mounted thereon. Above the rack 246 is a small gear 248, held on a shaft 249 carried by side wall 234. Above the gear 248 is a second drive gear 250 also carried by side wall 234. The gear 250 carries a pin 254 best shown in FIGURE 10. To the pin 254 is pivotally connected the upper end of a connecting link 256 best shown in FIGURES 10 and 11. It will be noted that the gear 250 is provided with a plurality of holes 258 to accept the pin 254. The holes 258 provide adjustment of stroke by being progressively further from the center of gear 250 and are laid on an arc so that start point of stroke remains constant.

To the side 236 of head 232, there is journaled a larger gear 260 on shaft 262. The gear 260 has an override hub 264. The override hub 264 comprises two halves 266 and 268. Engaging abutments 270 and 272 provide contacting relationship between the halves 266 and 268. The half 268 carries a pin 274 upon which the connecting link 256 is positioned at the bottom end. Thus a driving connection between the gear 250 and half 268 is provided.

A pin 276 is carried near the top of side 236 and a spring 278 extends between the end of pin 276 and a pin 280 on gear 260. By reference to FIGURE 9, it will be observed that forward motion of rack 246 moves gear 248 in a clockwise direction in turn rotating gear 250 in a counterclockwise direction, pulling the connecting link 256 upwardly and to the right and thus rotating the half 268 of override hub 264 counterclockwise. This permits the spring 278 to pull the gear 260 for counterclockwise movement, indicated by the arrow 282 in FIGURE 9.

The pickup arm

Continuing to refer to FIGURES 9, 10 and 11, note a vertically disposed pickup arm 284 at the forward end of the actuating head 232. This member comprises a square rod 285 sliding in guides 286 and having a rack 288 along the back edge that is engageable with the teeth of gear 260. Actuation of gear 260 as previously described is effective to move this unit vertically. At the bottom end of the pickup arm, there is exemplified a suction cup 290, connected by a screw clamp mechanism 292. It is to be understood that an actuating mechanism will operate in connection with the suction cup as known to cause the cup to grasp or release as necessary at a given instant. This, of course, can be synchronized with the movement of the head 232 by means of limit switches carried on the frame of the machine. It is believed that these details will be reasonably evident to one skilled in the art and, accordingly, such known constituents are merely alluded to rather than specifically described to avoid unduly complicating the disclosure.

Giving body to the chains during vertical travel

Before describing the operation of this embodiment of the invention, the manner in which the chains 30 and 60 are given lateral stability during vertical travel or dwell will be described.

As shown in FIGURE 3, the dwell between the front up-down sprockets 70, 72 is controlled by appropriate guide blocks. A forward guide block 293 is fastened to the wall 102 by bolts (the bolts are shown in section 294).

This block is fixed but placed in proper alignment to snug up against the front of the chain path between sprockets 70 and 72.

Opposite the block 293 there is provided an adjustable block 295 with slots therein for movement on mounting pins 296. Adjustment is provided by means of bolts 297 passing through a fixed block 298 mounted to the wall 100.

From the foregoing, it will be understood that as the chain 60 passes between blocks 293 and 295, no lateral sway is permitted.

At the back, between sprockets 74 and 76, a similar set-up is provided. This includes a fixed block 299 and an adjustable block 300, mounted with pin and slot arrangement shown. Adjustability is by bolts 297 passing through a fixed block 301.

SUMMARY OF THE OPERATION OF THE EMBODIMENT OF FIGURES 3–11

Representing the rollers 132 as the work points 42 and 78 of FIGURES 1 and 2, it will be observed that as the chains 30 and 60 move these points or rollers travel together. As shown in FIGURE 3, the two rollers will be understood to be in the half-way vertical position. This has caused the one on chain 60 to be moved ahead. Referring to FIGURE 9, this will cause the thrust rod 150 to move forward and rotate gear 250 in counterclockwise direction. This pulls link arm 256 upwardly to turn the half 268 of override hub 264 counterclockwise, permitting the spring 278 to rotate gear 260 in the direction 282. This drives the pickup rod 284 downwardly and lets the spring 278 move the suction cup 290 into contact with the top element of a work stack; and then stop.

It will be noted that when contact by cup 290 is made, the half 268 continues to rotate giving the spring all the freedom it needs. The spring thus finds its own bottom irrespective of variable height of the stack.

Referring back to FIGURE 3, it will be noted that when roller of chain 60 passes the sprocket 72, the up motion begins by reverse movement of thrust rod 150. This causes gear 248 to rotate counterclockwise, driving gear 250 clockwise, pushing link 256 back down and thus half 268 clockwise. This causes abutment 272 to engage abutment 270, turning gear 260 clockwise and thus lifting the pickup rod 284 and the vacuum cup 290 upwardly while carrying a work piece.

When the roller of chain 60 passes sprocket 64, the actuating head is ready to be retracted while the suction cup 290 remains in an up position; and the actuating head will be returned to the IN position designated in FIGURE 2. At the IN position, both rollers 132 pass their respective sprockets 36 and 66, at which point the IN motion will stop. Passage of the roller of chain 60 to the back of sprocket 74 causes down motion of the suction cup 290 by bucking rod 150 forward. A dwell ensues between sprockets 74 and 76; and an up motion follows between sprockets 76 and 68. At this point, the cycle is ready to repeat itself.

From the foregoing, it will be observed that the in-out motion has been perfectly synchronized with the up-down motion, in the manner of cams, but by the following improved characteristics:

(1) Using two simple chains of the same length, travelling in predetermined linear and curvilinear paths of the same length;

(2) The path of movement of the chains is converted *directly* into work force, i.e., movement or dwell. Thus, no intervening linkage system is required as in a rotary cam system.

A SECOND SPECIFIC EMBODIMENT

*In-out grasp-drop loader*

FIGURES 12–20 illustrate a loader or article transfer device or apparatus that is adapted to perform the following operations:

| First Motion (In-Out) (cycle) | Second Motion (Grasp-Drop) |
|---|---|
| (a) Reach into a press | Dwell. |
| (b) Dwell | Grasp. |
| (c) Pull out of press | Dwell. |
| (d) Dwell | Drop. |
| (cycle) | |

From the foregoing, it will be observed that as a transfer arm reaches into a press, the grasping motion is dwelling; thus there is no motion by the work head. Then after the reach is completed, this motion dwells in the IN position and the second motion is converted to grasp. Thus, the piece in the press is grasped by the work head carried on the transfer arm and the grasp motion then dwells, retaining the grasp.

Next, the first motion reverses and pulls the piece from the press while the second motion dwells in the grasp position and retains the grasp. Then as the first motion dwells or stops its retracting movement, the second motion is actuated to release the grasp and drop the piece. The cycle is then ready to repeat.

It will be understood as the description develops that these motions are synchronized with the motions or actions of a press or other device to which the loader of invention is operatively associated.

Figure 12:
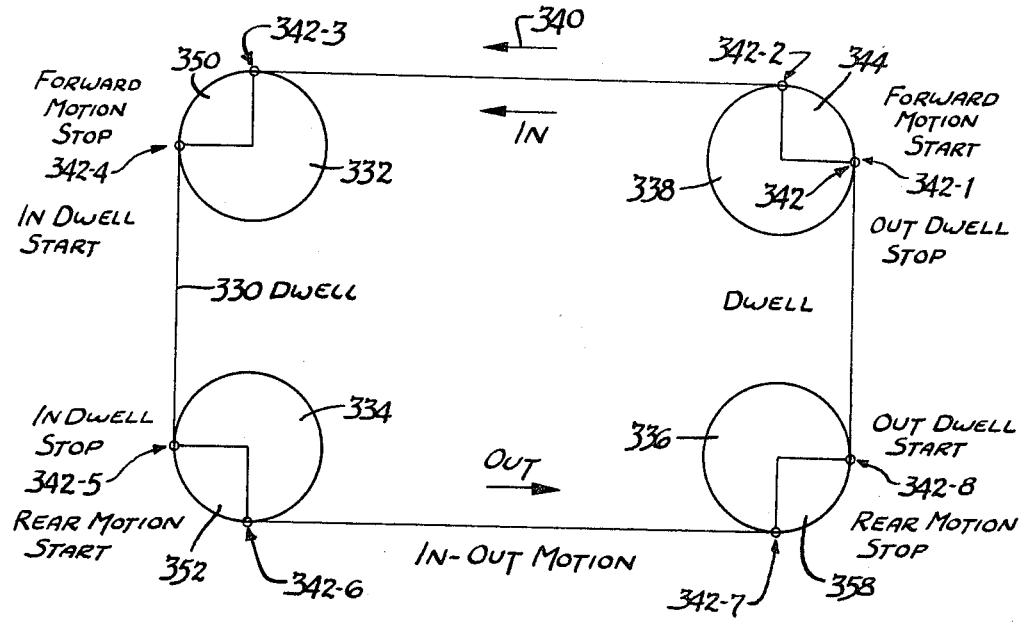
FIGURE 12 is a schematic view similar to FIGURE 1 illustrating a first motion and dwell for use in a second embodiment.
Figure 13:
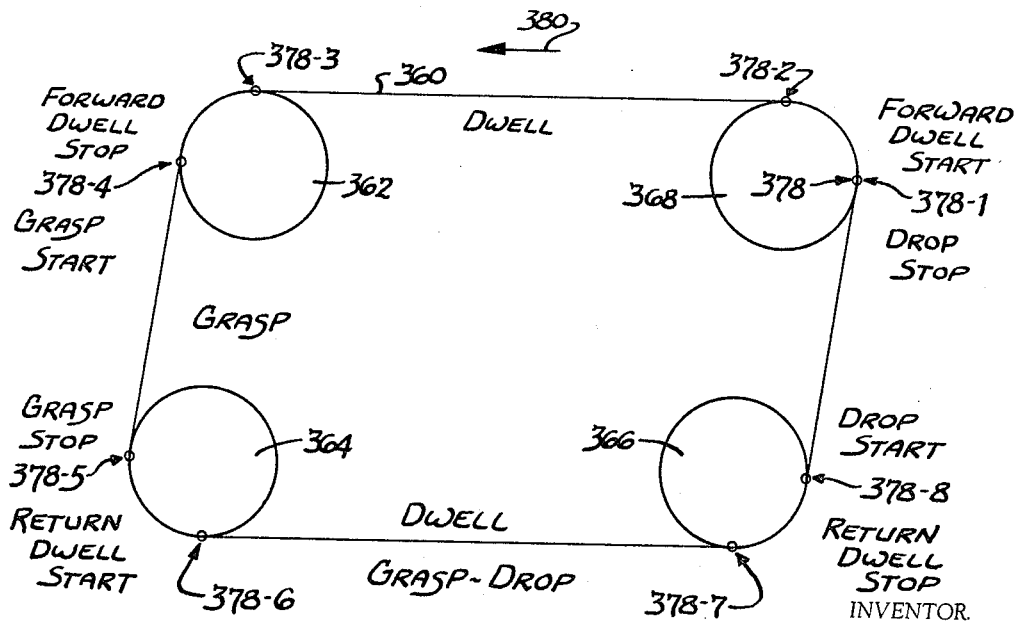
FIGURE 13 is a schematic view illustrating third motion and dwell and synchronized with the motion and dwell of FIGURE 12, also produced in accordance with the invention and for use in a second embodiment of invention.

*The theory—FIGURES 12 and 13*

To provide a proper foundation for description of the various elements of the loader and its two different motions, please refer to FIGURES 12 and 13.

In FIGURE 12, the In-Out motion is established with intermittent dwells therebetween. These are shown schematically, but precisely as they are effected in the apparatus of FIGURES 14–20.

In FIGURE 13, the Grasp-Drop motions are established precisely as used in the machine of FIGURES 14–20. In this embodiment as well as that previously described, chains have been utilized because of their flexibility, ease of shortening or lengthening by removal or addition of links, and non-stretchable characteristics. Accordingly, the chain of FIGURE 12 is designated by the reference numeral 330. This is supported on sprockets 332, 334, 336 and 338 that are in turn supported upon a machine frame as will be hereinafter described.

It will be observed that the four sprockets 332, 334 336 and 338 have their centers precisely at the four corners of a vertically disposed and horizontally elongated rectangle. Thus, the four sprockets 332, 334 336 and 338 establish the precise path of movement over which the flexible chain 330 is travelled through linear and curvilinear movements. In explanation, let it be stated that the chain 330 moves in the arrow 340 direction.

*The IN motion*

The point Forward Motion Start at the backside of sprocket 338 will be used as the initial reference point for the work connection point 342. This is 342–1. The point Forward Motion Stop at the front side of sprocket 332 represents the forward limit of IN movement, or work point 342–4 position.

From the foregoing, it will be understood that with chain 330 moving in the arrow 340 direction, the IN movement of work point 342 begins at Forward Motion Start position; moves from 0 to full acceleration while traveling the 90° quadrant 344 of sprocket 338, attaining full acceleration at the point 342–2. Full speed from 342–2 to 342–3, and then deceleration from 342–3 to 342–4 follow.

At the Forward Motion Stop point, the IN Dwell starts and is sustained until the point In Dwell Stop or 342–5 is reached. At this point, the OUT movement begins, accelerating through the quadrant 352 decelerating through the quadrant 358 and terminating at the point 342–8, Rear Motion Stop.

At point 342–8, the Out Dwell Starts, and continues to the point 342–1, Out Dwell Stop.

This completes a full cycle of IN and OUT movement; the IN or forward movement is now ready to recommence.

*Grasp-drop motion*

Referring now to FIGURE 13 of the drawings, note a second chain 360, supported on a plurality of four sprockets 362, 364, 366 and 368.

This chain and sprocket system establishes dwell, grasp, dwell and drop, in that order, in synchronism with the IN motion, dwell, OUT motion and dwell of chain 330, FIGURE 12.

Now beginning with the work connection point 378 of chain 360 at the point 378–1 (Forward Dwell Start), observe that this point travels in exact synchronism with the work point 342 on chain 330 between the points 378–1 and 378–4. Acceleration, full speed and deceleration are according to point 342 on chain 330. This is premised on the fact that sprockets 362, 364 and 366 and 368 are of the same size as sprockets 332, 334, 336 and 338 and that chains 360 and 330 are of the same length and are driven at the same speeds, so that the points 378 and 342 are always in side-by-side horizontal alignment.

Further, referring to FIGURE 13, presume chain 360 to move in the arrow 380 direction in synchronism with movement of chain 330. The Forward Dwell Start point 378–1 represents the beginning of the dwell for the work point 378 during the IN motion produced by work point 342 of chain 330. This dwell is developed because of equivalent movement of work point 378 between 378–1 and 378–4 as the work point 342 moves between 342–1 and 342–4.

This dwell continutes to the point Forward Dwell Stop or 378–4 on the sprocket 362.

Now while the work point 342 on chain 330 moves directly vertically downwardly, through its IN dwell, the work point 378 moves slightly forwardly to the point 378–5. This differential movement will be effective to stroke a grasp arm as will be later described to pick up or grasp a piece such as stock in a punch press or the like. At point 378–5, the Return Dwell Starts and the grasp is retained. Then the dwell continues to the point 378–8, while the OUT motion is effected by chain 330 between the points 342–5 and the point 342–8.

At 378–8, the Drop Starts and continues to the point 378–1, Drop Stop. At this point, the cycle is ready to repeat itself.

In view of the foregoing schematic description of the motions involved, the second embodiment of the invention as shown in FIGURES 14–20 will now be described in complete detail.

*The actual in-out grasp-drop loader of FIGURES 14–20*

Figure 14:
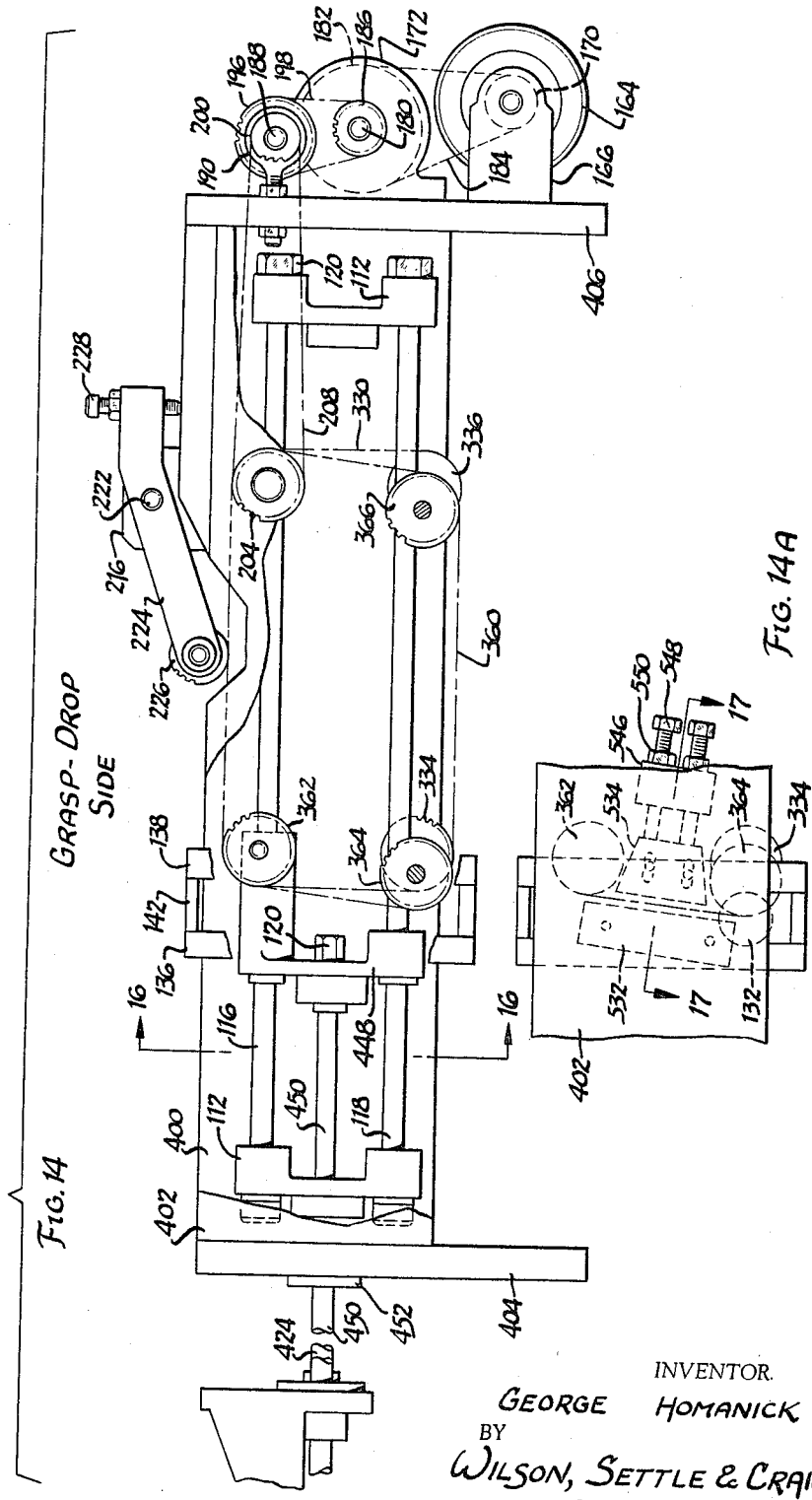
FIGURE 14 is a side elevation of a loader forming a second specific embodiment of the invention and utilizing the motions and dwells of FIGURES 12 and 13.

In FIGURE 14, the machine has a frame comprising side walls 400 and 402, a front wall 404 and a rear wall 406. The side wall 400 carries the sprockets 332, 334, 336 and 338.

Extending between the side walls 400 and 402 are front and rear brackets 112. These support two sets of upper and lower rods 116 and 118 which are parallel, horizontally disposed and vertically spaced. Cap screws 120 at each end hold the rods 116 and 118 in place.

It will be understood that the rods serve as slide guides for the carriage now to be described.

Figure 15:
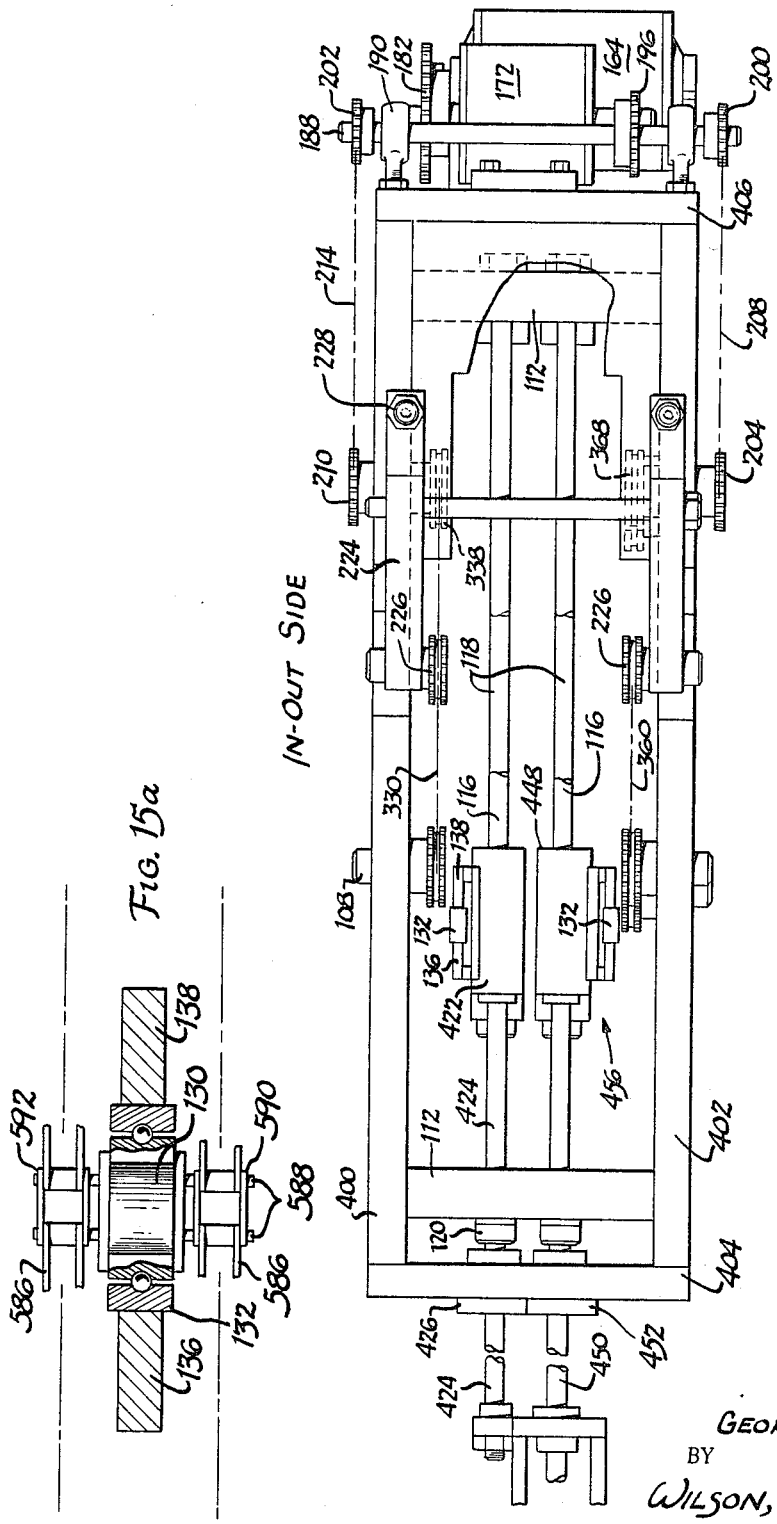
FIGURE 15 is a top plan view of FIGURE 14.

The In-Out carriage is designated 422, FIGURE 15, and contains bores for sliding movement upon the rods 116 and 118. Centrally, the carriage is apertured to receive an IN and OUT rod 424 that slidably extends through a bushing 426 in front wall 404.

A ball bearing roller 132 is cantilevered on chain 330 in the manner shown in FIGURES 6 and 7.

Figure 16:
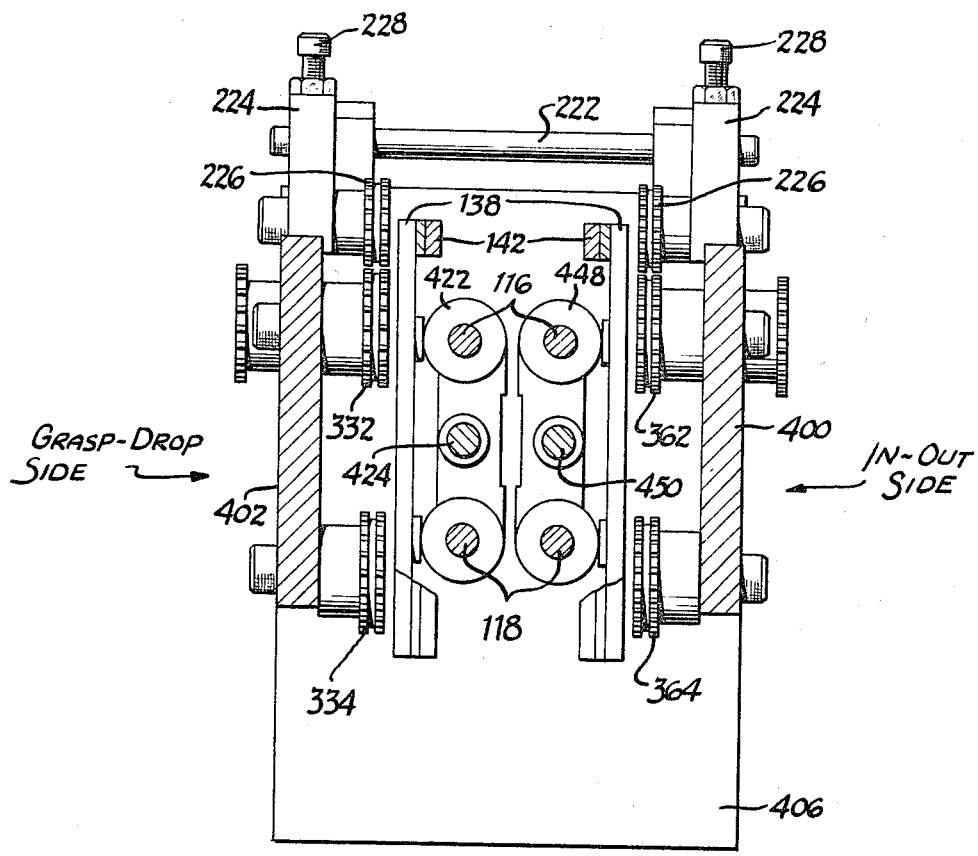
FIGURE 16 is a section taken along the line 16—16 of FIGURE 14.
Figure 17:
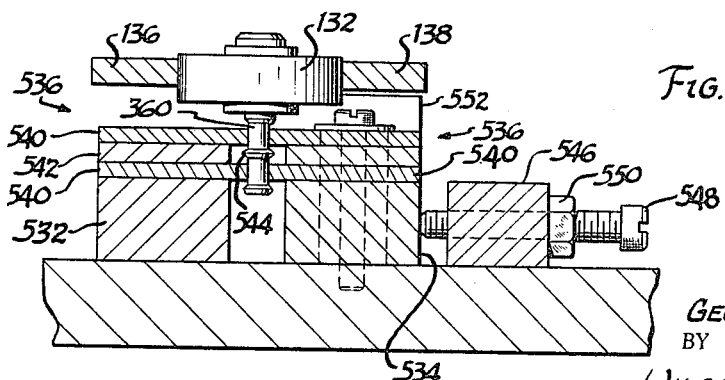

The roller runs between two guide plates 136 and 138 connected to the carriage 422 as shown in FIGURES 15, 16 and 17. The guide plates 136 and 138 are vertically disposed, parallel and horizontally spaced to accommodate the roller therebetween. Each of the guide plates 136 and 138 carries spacer members and cross bridge members to tie the two guide plates together as previously described relative to FIGURES 3, 4, 4b and 5, forming a track for the roller carried by chain 330. The guide plates are carefully machined and spaced a few thousandths wider than the diameter of the roller to provide maximum accuracy during operation of the unit.

From the foregoing, it will be understood that when the chain 330 moves its roller, it will be effective to carry the carriage 422 in a forward and rearward manner. When the roller is moving vertically downwardly between the guides, carriage 422 is stopped and a dwell will be established.

The grasp-drop mechanism

Continuing to refer to FIGURES 14, 15 and 16, note that the side wall 402 carries the sprockets 362, 364, 366 and 368. The carriage 448 is bored to slide upon the left hand set of upper and lower rods 116 and 118 and is also centrally bored to receive the rear end of a thrust rod 450. At the front wall 404, the thrust rod extends through a bushing 452.

A cantilevered roller is carried on the chain 360 in the manner of FIGURES 6 and 7 forming a connection between carriage 448 and the chain 360. The remainder of the connection between chain 360 and carriage 448 comprises vertically disposed, parallel and horizontally spaced guide plates with spacers and bridge members as previously described. This assembly is designated 456 in FIGURE 15. Movement of chain 360 thus moves carriage 448 in accordance with the path of the chain.

Exact departure of chain 360 from sprocket 362 for example, to provide perfect synchronization is in accordance with FIGURE 3a. Thus, extra sprockets are provided to make the chain 330 lap to an exact point.

Drive unit

The drive for the unit is typified by that previously described relative to FIGURE 8 and comprises a motor 164 carried on brackets 166. The motor has a shaft carrying a sprocket 170. A clutch brake mechanism 172 is connected to the rear plate 406 above the motor 164 and also has a shaft 180 carrying a sprocket 182. A chain 184 laps the sprockets 170, 182 to provide a driving relationship.

The shaft 180 of clutch brake unit 172 also carries a sprocket 186. A jack shaft 188 is carried in bearings 190 fastened to back plate 406.

At the left central portion, the jack shaft 488 carries a sprocket 196 and a chain 198 laps sprockets 186 and 196 in driving relation.

At the left end, the jack shaft 188 carries a drive sprocket 200. At the right end a sprocket 202 is provided. A sprocket 204 is carried on the shaft upon which sprocket 368 is carried. A chain 208 laps sprocket 200 and drive sprocket 204 to provide driving connection with the left chain 36.

On the other side a driving sprocket 210 is carried on the shaft supporting sprocket 338. A chain 214 laps the sprockets 210 and 202 providing a driving relation.

Chain tightening mechanism

This comprises a block 216 fastened as by bolting to side plates 400 and 402 and carries a pivot shaft 222 on which lever 224 is mounted. Sprockets 226 are journaled at the forward ends of levers 224 to engage the chains 330 and 360. An adjusting bolt 228 passes through the back end of lever 224 engaging the top edge of side walls 400 and 402. After a suitable tension has been established in the chains, lock nuts set the assembly.

Chain rigidifying mechanism during vertical travel

This is shown in FIGURES 14, 14a and 17 as comprising two vertically disposed guide plates 532 and 534 respectively carrying guide elements 536. Each guide element 536 comprises two spaced plates 540 and a separator plate 542, FIGURE 17. Note that separator plate 542 is of lesser width than plates 540 to accommodate the hub segments 544 of the chain 360. The plate 534 is secured as by a bolt in a slot. Spacing adjustment is provided by a block 546 receiving bolts 548 that bear against the side of block 534 and when proper adjustment has been provided, a lock nut 550 is set.

By moving between the guide elements 536, the chain is in effect rigidified and thus the roller cannot wobble during its downward movement between the carriage plates 136, 138. This gives body to the chain and prevents vibration during vertical movement, that would otherwise effect the operating head by producing relative fluttering movement between the in-out rod 424 and the actuating rod 450. Additional steadying is provided the roller in the form of a block 552 carried on guide member 536 so that the back edge of the roller engages it in steadying relationship during downward movement, FIGURE 17.

The grasp-drop head

Referring to FIGURES 18, 19 and 20, note the grasp-drop head as comprising a back plate 554 that is apertured to receive the forward end of in-out rod 424, being retained by nut 556. The back plate 554 carries a bushing 568 to slidably receive the actuating rod 450. At the forward end, the actuating rod 450 is provided with a rack 570.

The side walls 572 and 574 project forwardly from back wall 554 and receive a pivot shaft 576. A gear 578 is carried centrally on pivot shaft 576. At each end of the shaft 576 are carried the shoulders 580 of a grasp arm 582. It will be evident that horizontal movement of rack 570 will pivot the grasp arm 582 through gear 578. Co-operating with the movable grasp arms 582 are fixed grasp arms 584 projecting forwardly from side walls 572 and 574.

Summary of operations

Reverting to FIGURES 14 and 15, note that simultaneous forward movement of carriages 422 and 448 provides no relative movement between rods 424 and 450. However, while the chain 330 travels vertically downwardly, it will be noted that the chain 360 has a slight forward movement, moving the actuating rod 450 forwardly and bringing the jaws 582 up to the clamp position shown in FIGURE 18. When both chains reach bottom, the forward motion is preserved and their rollers move carriages 422 and 448 to the rear in a slightly staggered relation to preserve the grasp. Then chain 330 moves vertically upwardly while chain 360 moves upwardly and to the rear, thus opening the jaw 582 or pivoting it downwardly by the relative movement between the rods 424 and 450. Thus, an article that has been grasped at the forward end of the stroke is dropped at the rear of the stroke.

As previously mentioned, the grasp chain 360 then dwells while the IN and OUT chain causes forward motion again. Thus, the jaws remain open during the forward motion and at the end of such forward motion are clamped shut again to grasp another piece.

EXTENDED SCOPE OF INVENTION

The foregoing description has related to an electric motor drive through a clutch brake mechanism to propel the chains in synchronized relation. However, the extended scope of invention would include this clutch-brake mechanism being actuated by a limit switch on cooperating equipment such as a punch press, stamping press, or by actuating a feeler finger as a part moves down an assembly line signaling placement of another part thereon. Of course, it is to be considered that such part would be in a jig so that proper orientation would be provided for dropping on the next part by means of the loader of invention.

In addition to the drive on the equipment itself and the use of a limit switch on cooperating equipment, the logical scope of invention would include direct drive from cooperating equipment. Thus, the jack shaft could be driven from a gear that turned during operation of a press. Accordingly, when the press was stopped, the associated loader would also be automatically stopped.

VARIABLE SPEED MOTOR

Of course, it is to be considered within the scope of invention that the motors 164 could also be variable speed units, in order to change for synchronization with cooperating equipment.

While the actuating roller has been shown as a cantilevered affair, it is to be understood that logical scope of invention in this regard would include a roller stradded between two spaced chains without departing from the scope of invention. This is shown in FIGURE 15a.

In this aspect, the chain halves 586 are spaced apart with connecting pins 588 extending through the hub of the roller 132 placed between the chain halves. Plate elements 590 and 592 hold the pins 588 in place at each end.

The roller bushing 130, 132 thus operates between the chain halves 586 as it rides between the vertical plates 136, 138. It is to be understood that the chain will straddle an element 136 or 138.

An advantage of this system is that no cantilever stress is imposed on the chain or roller and accuracy and precision of the system are somewhat enhanced.

Variable stroke

By removing pitches or links of the chain and by placing the sprockets on movable plates, it is to be understood that the length of the stroke can be shortened. Also, by adding links to the chain, the stroke can be lengthened. In this regard, of course, it is mandatory that addition or removal be made from both chains.

Other linear elements

While the foregoing specification and description has related to the use of chains, a logical extension of this would include other linear elements which are non-stretchable but which are flexible. Such would include steel cable timing belts and the like.

Multi-drives

The foregoing embodiment in a sense reflects the basic concept of the present invention. Thus, synchronized motion and dwell are provided using at least two flexible linear elements travelling through fixed or predetermined paths. A logical extension of this aspect of the scope of invention follows: Thus, more than two units can be placed side-by-side or in other orientation relative to one another as long as they are driven in synchronism to provide a multi-drive set up. Stating this aspect in another way, presume that a very large sheet such as an automobile top needed to be lifted and removed from a press. By placing several units so that the grasp arms would take hold at different portions of the stamped sheet, it can be understood that synchronized plural lifting motions can be provided. This is essentially a duplication of the basic concept shown above.

The foregoing description has related to two specific chain paths for the actuating path. Within the logical extension of invention, it is to be understood that these can be otherwise configured to provide plural motion and dwells at the end of the in-out strokes and others.

In the prior description, the work connection between the chain and carriage has been defined by guideways 136 and 138 of straight configuration, thus defining a lineal guide for the roller 132. In the extended scope of invention, however, it is to be understood that these can define a cam-like path as distinguished from a straight path. Thus, as the path established by sprockets 62, 70, 72 and 64 of FIGURE 2. Thus, the guide can be the shape 78–4, 78–5, 78–6 and 78–7 of FIGURE 2.

By so operating, a chain having a true vertical path as in FIGURE 1 could be utilized and as work point 78 travels the path defined by the guideway, the relative movement would be imparted to the carriage analogous to FIGURE 2.

ADVANTAGES OF THE PRESENT INVENTION

It is believed that the advantages inherent in the principles and structures presented in the foregoing description have been self-evident as such description progressed. However, it is believed worthy that the advantages should be highlighted as follows:

(1) Flexible linear elements moving through predetermined linear and curvilinear paths are utilized to produce work of cams with motions and intermittent dwells. A much more economical structure is provided resulting in an exact synchronization when compared to the expensive dwells through degrees of rotation that must be milled or formed into rotary cam profiles.

(2) Particular advantage of the invention resides in direct translation of predetermined linear motion into work motions or dwells without intervening lever structures or translating devices as are inherent in rotary cams. As has been previously mentioned cam followers and linkage systems of rotary cams are not utilized in the present invention; thus substantial reduction in costs are inherent.

(3) Synchronization is provided by two or more lines having different paths but identical lengths with work points once aligned, remaining in such alignment and the lines being locked together in driving relation through a synchronized drive source.

I claim:

1. Apparatus for driving a work element in compound cyclic motion comprising a first endless chain operatively trained about a first series of rotatable sprockets for movement along a first endless path determined by the location of the first sprockets relative to each other, a second endless chain operatively trained about a second series of rotatable sprockets for movement along a second endless path determined by the location of said second sprockets relative to each other, said first and said second endless paths lying in parallel general planes, a first element mounted for sliding movement along a predetermined third path, first means coupling said first element to a selected point on said first endless chain for transmitting from said first chain to said first element that component of movement of said point on said first chain along said first path which is parallel to said third path, a work element mounted upon said first element for movement relative to said first element along a fourth path extending transversely to said third path, second means coupling said work element to a selected point on said second chain for transmitting from said second chain to said work element movement of said point on said second chain relative to said point on said first chain to drive said work element along said fourth path in movement proportionate to the movement of the points on the respective chains relative to each other, and means for driving said chains along their respective paths.

2. Apparatus as defined in claim 1 wherein said first path is of generally rectangular configuration and said third path extends parallel to one pair of sides of the rectangular first path, said second path having at least one portion thereof extending parallel to a side of said first path and having a second portion inclined with respect to said first path.

3. Apparatus as defined in claim 1 wherein said first path is of generally rectangular configuration and said third path extends in parallel relationship to one pair of sides of the rectangular first path, said second path being of the same length as said first path and having a different configuration than said first path, said driving means being operable to drive said chains along their respective paths at the same speed.

4. In apparatus for producing work,
   a frame having first and second parallel sides,
   four spaced rotatable supports mounted on the first side in rectangular array,
   a first flexible endless lineal element lapping said rotatable supports for lineal and curvilineal movement,
   a work head having relatively movable parts, and being lineally movable on said frame,
   a relatively movable connection between said work head and a point on said flexible element,
   four spaced rotatable supports mounted on the second side of said frame in rectangular array substantially identical and in side-by-side relation to those on the first side,
   at least one rotatable support positioned between each of spaced pairs of the rotatable supports on the second side and staggered in a common direction relative to the pairs,
   a second flexible endless lineal element lapping said rotatable supports of said second side for lineal and curvilineal movement,
   a connection between a movable part of said work head and a point on said second flexible element,
   and means for moving said lineal elements in common direction and at common speed,
   whereby movement of said lineal elements to move said connections between first and second respective rotatable supports produces lineal movement only of said work head and movement of said connections between second and third respective rotatable supports holds said work head stationary and simultaneously produces relative movement of the parts of the work head to produce a work function.

5. In apparatus for producing work,
   a frame having first and second sides,
   a first plurality of spaced supports on said first side defining a first path,
   a first flexible endless element lapping said first supports for lineal movement through said first path,
   a first carriage movable on said frame,
   a functional connection between said first carriage and a point on said first flexible endless element,
   a second plurality of spaced supports on said second side defining a second path,
   a second flexible endless element lapping said second support for lineal movement through said second path,
   said second path being different from said first path,
   a second carriage movable on said frame,
   a functional connection between said second carriage and a point on said second flexible element,
   a work head movably carried by one of said first and second carriages,
   said work head having an actuating rod,
   and a functional connection between said actuating rod and the other of said carriages.

6. In apparatus for producing a single work output motion,
   a frame,
   a first set of four spaced rotatable supports mounted on said frame in rectangular array and defining a first path,
   a first flexible endless element lapping said first supports for lineal movement through said first path,
   a second set of four spaced rotatable supports mounted on said frame in rectangular array substantially identical to said first set and defining a second path,
   at least one rotatable support positioned between each of spaced pairs of said second set of supports, staggered in a common direction relative to the pairs,
   a second flexible endless element lapping said second supports for lineal movement through said second path,
   said second path being different from said first path,
   said first and second elements and paths being of the same length,
   a work head coupled to and movable by one of said flexible elements, said work head having a movable element for performing a work function,
   and a connection between said movable element and the other of said flexible elements.

7. In apparatus for producing a single work output motion,
   a frame,
   a first set of four spaced rotatable supports mounted on said frame in rectangular array and defining a first path,
   a first flexible endless element lapping said first supports for lineal movement through said first path,
   a second set of four spaced rotatable supports mounted on said frame in the array of a parallelogram wherein two of the supports are staggered relative to the remaining two supports, and the second set defining a second path, different from said first path,
   a second flexible endless element lapping said second supports for lineal movement through said second path,
   said first and second elements and paths being of the same length,
   a work head coupled to and movable by one of said flexible elements,
   said work head having a movable element for performing a work function,
   and a connection between said movable element and the other of said flexible elements.

References Cited by the Examiner
UNITED STATES PATENTS

| | | | |
|---|---|---|---|
| 1,077,815 | 11/1913 | Droitcour | 74—37 |
| 1,513,012 | 10/1924 | Schey | 74—240 |
| 1,624,662 | 4/1927 | Halvorsen. | |
| 1,774,321 | 8/1930 | Detfurth | 74—37 |
| 2,040,934 | 5/1936 | Gillen | 74—37 |
| 2,382,102 | 8/1945 | Salstrom et al. | 74—37 X |
| 2,481,653 | 9/1949 | Freeman | 74—222 X |
| 2,528,286 | 10/1950 | Pianta et al. | 74—37 |
| 2,564,816 | 8/1951 | Rehwald | 74—37 |
| 2,987,928 | 6/1961 | Tedford | 74—37 |

FOREIGN PATENTS

| | | |
|---|---|---|
| 629,632 | 10/1961 | Canada. |
| 522,564 | 4/1921 | France. |

FRED C. MATTERN, Jr., *Primary Examiner.*

DON A. WAITE, MILTON KAUFMAN, *Examiners.*

B. G. DURHAM, D. H. THIEL, *Assistant Examiners.*